US008904746B2

(12) United States Patent
Fang et al.

(10) Patent No.: US 8,904,746 B2
(45) Date of Patent: Dec. 9, 2014

(54) METHOD AND APPARATUS FOR SEGREGATED OIL SUPPLY AND SCAVENGE IN A GAS TURBINE ENGINE

(75) Inventors: Ning Fang, Mason, OH (US); Gary Paul Moscarino, Cincinnati, OH (US); Adam Mitchell Record, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 741 days.

(21) Appl. No.: 13/225,510

(22) Filed: Sep. 5, 2011

(65) Prior Publication Data

US 2013/0055721 A1 Mar. 7, 2013

(51) Int. Cl.

| | |
|---|---|
| ***F02C 7/06*** | (2006.01) |
| ***F01D 25/18*** | (2006.01) |
| ***F01D 9/06*** | (2006.01) |

(52) U.S. Cl.

CPC .......... *F01D 9/065* (2013.01); *F05D 2260/609* (2013.01)

USPC .......................................... 60/39.08; 184/6.11

(58) Field of Classification Search

USPC ................................. 60/39.08, 796; 184/6.11

See application file for complete search history.

(56) References Cited

U.S. PATENT DOCUMENTS

| | | | | |
|---|---|---|---|---|
| 3,528,241 A * | 9/1970 | Gill, Jr. et al. | ............... | 60/39.08 |
| 6,470,666 B1 | 10/2002 | Przytulski et al. | | |
| 2009/0133581 A1 | 5/2009 | Fang et al. | | |
| 2010/0027926 A1 | 2/2010 | Fang et al. | | |
| 2010/0027930 A1 | 2/2010 | Kinnaird et al. | | |

FOREIGN PATENT DOCUMENTS

| | | | | |
|---|---|---|---|---|
| GB | 736017 | * 8/1955 | ............. | F01D 11/04 |

* cited by examiner

*Primary Examiner* — Andrew Nguyen

(74) *Attorney, Agent, or Firm* — William Scott Andes; Trego, Hines & Ladenheim, PLLC

(57) ABSTRACT

A gas turbine engine oil supply and scavenge apparatus includes: a stationary first frame comprising a first hub and a first outer ring interconnected by an array of radially-extending hollow first struts; a forward wet cavity defined radially inboard of the first frame, having a first rolling element bearing disposed therein; a supply line extending from the first outer ring through one of the first struts and communicating with the forward wet cavity, the supply line adapted to discharge oil to the forward wet cavity; a stationary second frame comprising a second hub and a second outer ring interconnected by an array of radially-extending hollow second struts, the second frame disposed aft of the first frame; and a scavenge path communicating with the forward wet cavity and adapted to remove oil-air mist from the forward wet cavity, the scavenge path defined at least in part by the second frame.

17 Claims, 2 Drawing Sheets

METHOD AND APPARATUS FOR SEGREGATED OIL SUPPLY AND SCAVENGE IN A GAS TURBINE ENGINE

BACKGROUND OF THE INVENTION

This invention relates generally to gas turbine engine bearing sumps and more particularly to fluid flow provisions in bearing sumps.

A gas turbine engine includes one or more shafts which are mounted for rotation in several bearings, usually of the rolling-element type. The bearings are enclosed in enclosures called "sumps" which are pressurized and provided with an oil flow for lubrication and cooling. In most cases one of the boundaries of the sump will be a dynamic seal between a rotating component of the engine and the engine's stationary structure. Various tubes, connectively referred to as "service tubes", are used to supply oil to the sump, to drain spent oil from the sump, to pressurize the sump with air, and to vent air from the sump.

The bearings and sumps are mounted within a casing of the engine using stationary structural members commonly called frames, usually having a central hub connected to an annular outer rim with a plurality of radial struts. The above-mentioned service tubes frequently are routed through the struts. Some gas turbine engines incorporate a type of frame called a "turbine vane frame" or "TVF" instead of a traditional "turbine center frame" or "TCF". A TVF has fewer struts than a TCF and those struts are usually thinner in cross-section than a comparable TCF. Utilizing a TVF rather than a TCF can enhance the engine's performance and reduce the overall engine weight.

The thinner and fewer struts of a TVF, while providing several advantages, also challenge the ability to route large oil supply, scavenge, drain and ventilation tubes to bearing sumps.

Accordingly, there is a need for a configuration for routing tubes within a gas turbine engine having limited frame strut area.

BRIEF DESCRIPTION OF THE INVENTION

This need is addressed by the present invention, which provides a gas turbine engine in which some of the tubes needed to service a sump are routed through a turbine vane frame while the majority of the tubes are routed through a different path.

According to one aspect of the invention, an oil supply and scavenge apparatus for a gas turbine engine includes: a stationary first frame comprising a first hub and a first outer ring interconnected by an array of radially-extending hollow first struts; a forward wet cavity defined radially inboard of the first frame, having a first rolling element bearing disposed therein; a supply line extending from the first outer ring through one of the first struts and communicating with the forward wet cavity, the supply line adapted to discharge oil to the forward wet cavity; a stationary second frame comprising a second hub and a second outer ring interconnected by an array of radially-extending hollow second struts, the second frame disposed aft of the first frame; and a scavenge path communicating with the forward wet cavity and adapted to remove oil-air mist from the forward wet cavity, the scavenge path defined at least in part by the second frame.

According to another aspect of the invention, a method of supplying oil to a bearing in a gas turbine includes: flowing oil through a supply line that extends radially inward through a hollow strut of a stationary first frame, where the first frame comprises a first hub and a first outer ring interconnected by an array of radially-extending hollow first struts, and discharging the oil into a forward wet cavity disposed radially inboard of the first frame which encloses a first rolling element bearing; using the oil to lubricate the first rolling element bearing, whereby an oil-air mist is generated; and extracting the oil-air mist through a scavenge path which extends through a stationary second frame that comprises a hub and an outer ring interconnected by an array of radially-extending hollow struts, the second frame disposed aft of the first frame and the rolling element bearing.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
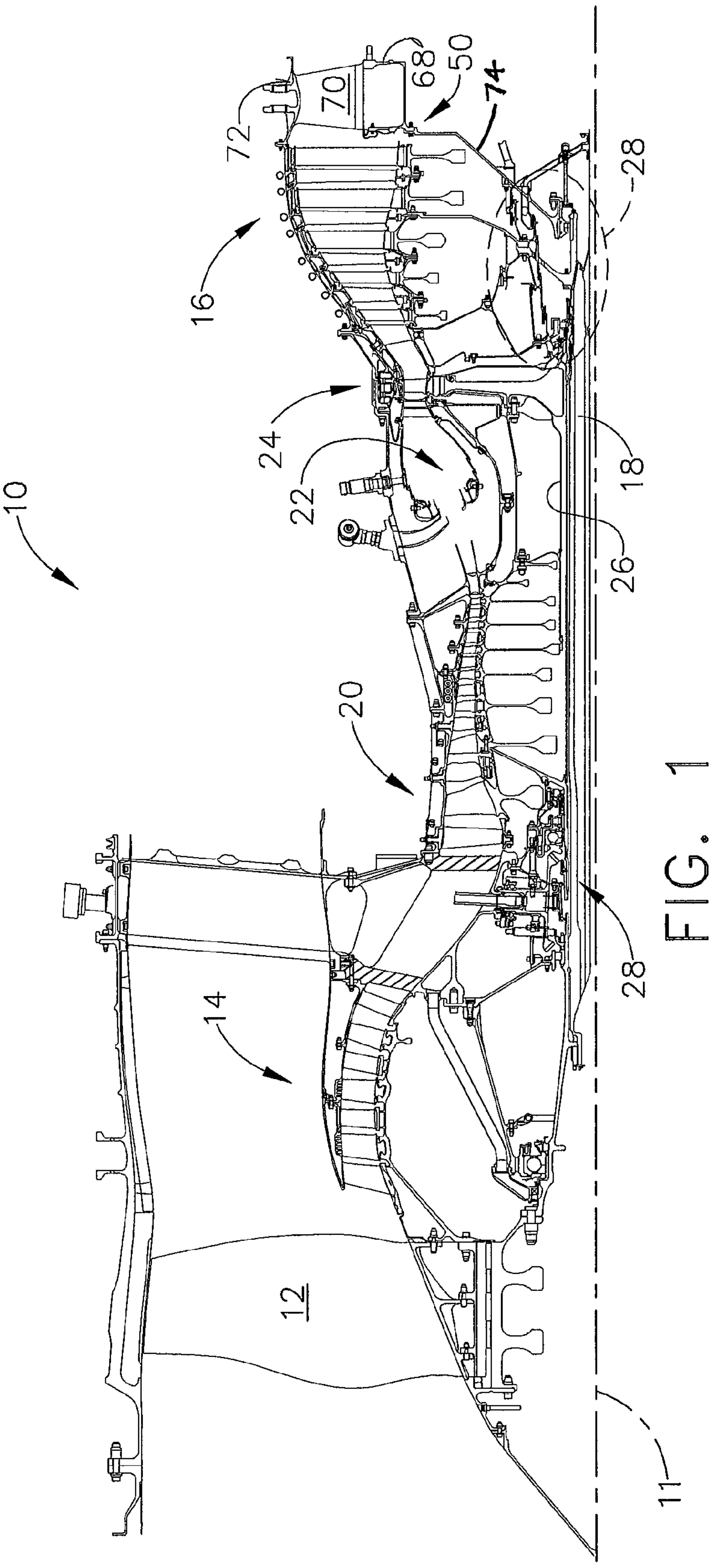
FIG. 1 is a half-sectional view of a gas turbine engine incorporating a rotating oil seal constructed according to an aspect of the present invention.

Referring to the drawings wherein identical reference numerals denote the same elements throughout the various views, FIG. 1 depicts a schematic view of a gas turbine engine 10. The engine 10 has a longitudinal axis 11 and includes a fan 12, a low pressure compressor or "booster" 14 and a low pressure turbine ("LPT") 16 collectively referred to as a "low pressure system". The LPT 16 drives the fan 12 and booster 14 through an inner shaft 18, also referred to as an "LP shaft". The engine 10 also includes a high pressure compressor ("HPC") 20, a combustor 22, and a high pressure turbine ("HPT") 24, collectively referred to as a "gas generator" or "core". The HPT 24 drives the HPC 20 through an outer shaft 26, also referred to as an "HP shaft". Together, the high and low pressure systems are operable in a known manner to generate a primary or core flow as well as a fan flow or bypass flow. While the illustrated engine 10 is a high-bypass turbofan engine, the principles described herein are equally applicable to turboprop, turbojet, and turboshaft engines, as well as turbine engines used for other vehicles or in stationary applications.

The inner and outer shafts 18 and 26 are mounted for rotation in several rolling-element bearings. The bearings are located in enclosed portions of the engine 10 referred to as "sumps". One such sump is noted at 28 in FIG. 1.

Figure 2:
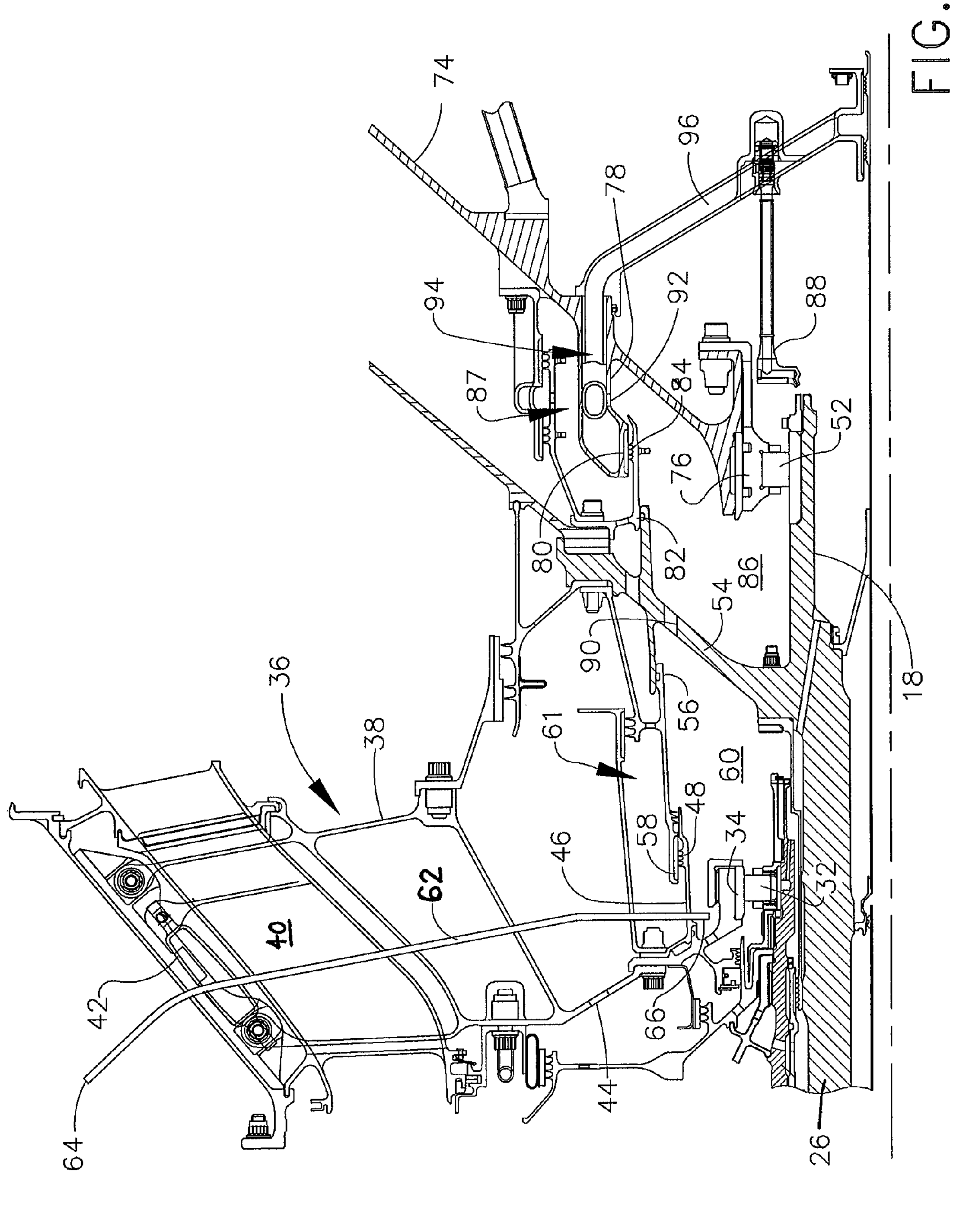
FIG. 2 is an enlarged view of an aft portion of the gas turbine engine of FIG. 1.

FIG. 2 shows an aft end of the engine 10 in and around the area of the sump 28 in more detail. The aft end of the outer shaft 26 is carried by a first bearing 32 which is this example is a roller bearing. The outer race 34 of the bearing 32 is attached to a static annular frame member of the engine 10. The frame member is a turbine vane frame or TVF 36. The TVF 36 includes a hollow annular hub 38 with a box-like cross-sectional shape, an array of hollow, airfoil-shaped struts 40, and an annular outer ring 42. A forward frame arm 44 extends in a generally radial direction inward from the hub 38. A stationary forward seal arm 46 extends axially aft from the forward frame arm 44. The distal end of the forward seal arm 46 includes a number of annular seal teeth 48 which extend radially outwards.

The aft end of the inner shaft 18 extends aft of the outer shaft 26 and is mounted for rotation in a turbine rear frame 50 of the engine by a second rolling element bearing 52, which in this example is a roller bearing. The inner shaft 18 has a disk

54 extending generally radially outward from it. The disk 54 extends between the inner shaft 18 and the LPT 16 (see FIG. 1) and transmits torque between the LPT 16 and the inner shaft 18.

A forward rotating seal 56 extends axially forward from the disk 54. The forward rotating seal 54 has a generally annular body. The forward end of the forward rotating seal 56 includes a radially inward-facing seal pocket 58 which may contain a compliant seal material of a known type such as abradable phenolic resin, a metallic honeycomb structure, a carbon seal, or a brush seal.

The forward end of the forward rotating seal 56 overlaps the aft end of the forward seal arm 46 in the axial direction, and the seal pocket 58 is aligned with the seal teeth 48 in the axial direction, so that they cooperatively form a rotating, non-contact seal interface. It is noted that the structure of the sealing components could be reversed; e.g. the forward rotating seal 56 could include radially-extending seal teeth while the forward seal arm 46 could include a seal pocket.

Collectively, the outer shaft 26, the inner shaft 18, the disk 54, the forward seal arm 46, and the forward rotating seal 56 define a forward "wet" cavity or "oiled" cavity 60. As used herein, the term "wet" or "oiled" when describing a cavity is used as a term to identify the enclosed space regardless of whether it actually contains oil or another fluid in a given operational condition. The radially adjacent forward dry cavity 61 is pressurized in operation, tending to create a positive pressure flow from dry to wet (i.e. a positive pressure gradient).

Pressurized oil flow is provided to the first bearing 32 through one or more supply lines 62. Typically several supply lines 62 would be arranged in an array around the circumference of the engine 10. Only one supply line 62 is shown in FIG. 2. The supply line 62 has a outer end 64 disposed outside the outer ring 42 of the TVF 36. This is coupled to an oil supply and circulation system of a known type (not shown). The supply line 62 passes through the hollow interior of one of the struts 40 and through the hub 38 and terminates in a nozzle 66 disposed within the forward wet cavity 60 near the first bearing 32. The nozzle 66 may discharge directly at the first bearing 32 or it may discharge oil generally into the area near the first bearing 32, with holes or orifices used to further route the oil to the first bearing 32. The supply line 62 is the smallest diameter of any of the service tubes, for example having an outside diameter of about 6.3 mm (0.25 in.) to about 12.7 mm (0.5 in.), and is readily accommodated within the struts 40.

The TRF 50 (see FIG. 1) is disposed aft of the LPT 16. The TRF 50 includes a hollow annular hub 68 with a box-like cross-sectional shape, an array of hollow struts 70, and an annular outer ring 72. An annular aft frame arm 74 extends radially inward and axially forward in a generally radial direction inward from the hub 68. Referring back to FIG. 2, the outer race 76 of the second bearing 50 is attached to the distal end of the aft frame arm 74. A stationary aft seal arm 78 extends axially forward from the aft frame arm 74. The aft seal arm 78 includes a radially inward-facing seal pocket 80 which may contain a compliant seal material of a known type as described above.

An aft rotating seal 82 extends axially aft from the disk 54. The aft rotating seal 82 has a generally cylindrical body. The aft end of the aft rotating seal 82 includes a number of annular seal teeth 84 which extend radially outwards.

The aft end of the aft rotating seal 82 overlaps the forward end of the aft seal arm 78 in the axial direction, and the seal pocket 80 is aligned with the seal teeth 84 in the axial direction, so that they cooperatively form a rotating, non-contact seal interface. It is noted that the structure of the sealing components could be reversed as described above.

Collectively, the inner shaft 18, the disk 54, the aft rotating seal 82, the aft seal arm 78 and the aft frame arm 74 define an aft "wet" cavity or "oiled" cavity 86. The radially adjacent aft dry cavity 87 is pressurized in operation, tending to create a positive pressure flow from dry to wet (i.e. a positive pressure gradient).

In operation, the first bearing 32 is supplied with oil from the nozzle 66 to provide lubrication and cooling, and the second bearing 52 is supplied with oil from another nozzle 88 to provide lubrication and cooling. The interaction of the oil supply and the bearings 32 and 52 creates a mist of oil within the wet cavities 60 and 86. A scavenge flow path passing axially aft and at least partially through the TRF 50 is provided to remove this oil mist from the forward and aft wet cavities 60 and 86.

To accommodate the scavenge flow, one or more transfer ports 90 pass through the disk 54 so that the forward and aft wet cavities 60 and 86 can communicate with each other. A scavenge port 92 is formed in the aft seal arm 78 and communicates with a scavenge plenum 94. A scavenge tube 96 communicates with the scavenge plenum. The scavenge tube 96 is coupled to the scavenge portion of an oil supply and circulation system as described above. The size of the scavenge tube in a typical application would be significantly greater than the size of the supply tube 62 described above.

In addition the scavenge service tubes, air flow to pressurize the dry cavities 61 and 87, and vent air flow from them is provided through a path passing through the TRF 50. Pressurization air flow could also be provided by bores or flow circuits inside or between the shafts 18 or 26 (not shown). Thus, only the supply tubes 62 need to pass through the TVF 36.

The oil supply and scavenge apparatus described above has several advantages over prior art designs. It may be used in any high performance engine structure requiring thin struts to enhance engine performance, or any engine design in which it is difficult to route large service tubes through small struts. The invention accommodates TVF technology, which leads to better engine performance and a lighter engine. As opposed to other solutions, it prevents life and weight impacts to the inner shaft 18.

The foregoing has described an oil supply and scavenge apparatus and method for a gas turbine engine. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. An oil supply and scavenge apparatus for a gas turbine engine, comprising:

a stationary first frame comprising a first hub and a first outer ring interconnected by an array of radially-extending hollow first struts;

a forward wet cavity defined radially inboard of the first frame, having a first rolling element bearing disposed therein;

a supply line extending from the first outer ring through one of the first struts and communicating with the forward wet cavity, the supply line adapted to discharge oil to the forward wet cavity;

a stationary second frame comprising a second hub and a second outer ring interconnected by an array of radially-extending hollow second struts, the second frame disposed aft of the first frame; and a scavenge path communicating with the forward wet cavity and adapted to remove oil-air mist from the forward wet cavity, the scavenge path defined at least in part by the second frame.

2. The apparatus of claim 1 wherein the second frame includes an annular rear frame arm extending radially inward from the second hub, and the scavenge path passes through the rear frame arm.

3. The apparatus of claim 1 wherein the second frame defines a scavenge plenum communicating with the scavenge path.

4. The apparatus of claim 3 wherein a scavenge tube communicates with the scavenge plenum and an exterior of the second frame.

5. The apparatus of claim 1 wherein the first bearing supports a hollow outer shaft for rotation relative to the first frame.

6. The apparatus of claim 5 wherein an inner shaft is disposed concentrically within the outer shaft and is supported for rotation relative to the second frame by a rolling-element second bearing.

7. The apparatus of claim 6 wherein the second bearing is disposed inside an aft wet cavity defined axially aft of the forward wet cavity.

8. The apparatus of claim 7 wherein the inner shaft includes an annular disk extending radially outward therefrom, the disk defining a boundary between the forward and aft wet cavities.

9. The apparatus of claim 8 wherein at least one transfer port extends through the disk so as to interconnect the forward and aft wet cavities.

10. A method of supplying oil to a bearing in a gas turbine, comprising: flowing oil through a supply line that extends radially inward through a hollow strut of a stationary first frame, where the first frame comprises a first hub and a first outer ring interconnected by an array of radially-extending hollow first struts, and discharging the oil into a forward wet cavity disposed radially inboard of the first frame which encloses a first rolling element bearing;

using the oil to lubricate the first rolling element bearing, whereby an oil-air mist is generated; and extracting the oil-air mist through a scavenge path defined at least in part by a stationary second frame that comprises a second hub and a second outer ring interconnected by an array of radially-extending hollow second struts, the second frame disposed aft of the first frame and the rolling element bearing.

11. The method of claim 10 wherein the second frame includes an annular rear frame arm extending radially inward from the second hub, and the scavenge path passes through the rear frame arm.

12. The method of claim 10 wherein the second frame defines a scavenge plenum communicating with the scavenge path.

13. The method of claim 12 wherein a scavenge tube communicates with the scavenge plenum and an exterior of the second frame.

14. The method of claim 10 wherein the first bearing supports a hollow outer shaft for rotation relative to the first frame.

15. The method of claim 14 wherein an inner shaft is disposed concentrically within the outer shaft and is supported for rotation relative to the second frame by a rolling-element second bearing, and the second bearing is disposed inside an aft wet cavity defined axially aft of the forward wet cavity, the method further comprising:

using a second flow of oil to lubricate the second rolling element bearing, whereby a second oil-air mist is generated; and extracting the second oil-air mist through the scavenge path.

16. The method of claim 15 wherein the inner shaft includes an annular disk extending radially outward therefrom, the disk defining a boundary between the forward and aft wet cavities.

17. The method of claim 16 wherein the oil-air mist is extracted from the forward wet cavity through at least one transfer port extending through the disk, and then through the aft wet cavity.

* * * * *